No. 881,398.　　　　　　　　　　　　　　　PATENTED MAR. 10, 1908.
J. M. HANSEN.
METHOD OF MAKING CIRCULAR WROUGHT METAL BLANKS.
APPLICATION FILED MAY 19, 1906.

2 SHEETS—SHEET 1.

WITNESSES.　　　　　　　　　　　　　　　INVENTOR.

No. 881,398. PATENTED MAR. 10, 1908.
J. M. HANSEN.
METHOD OF MAKING CIRCULAR WROUGHT METAL BLANKS.
APPLICATION FILED MAY 19, 1906.
2 SHEETS—SHEET 2.
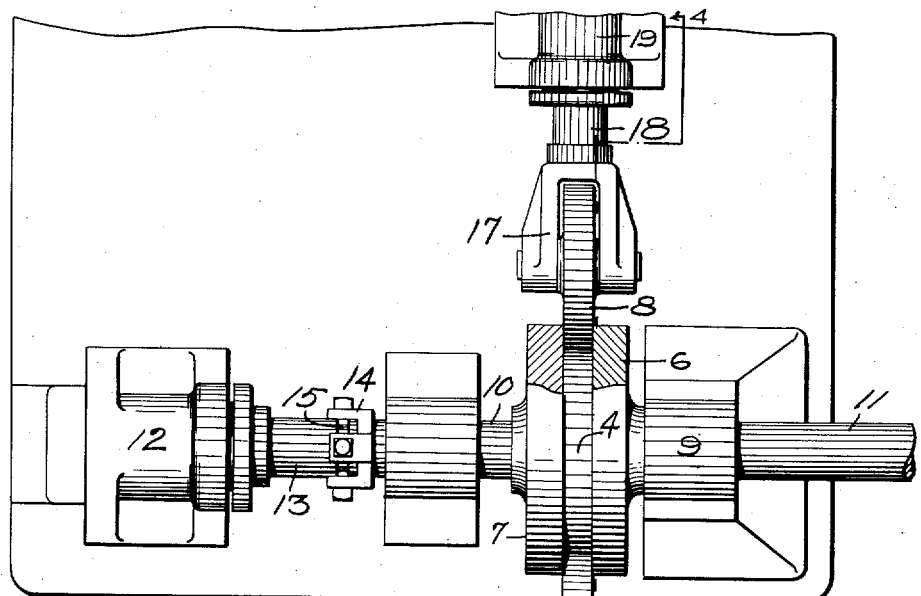
FIG. 3
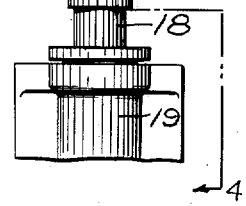
FIG. 4
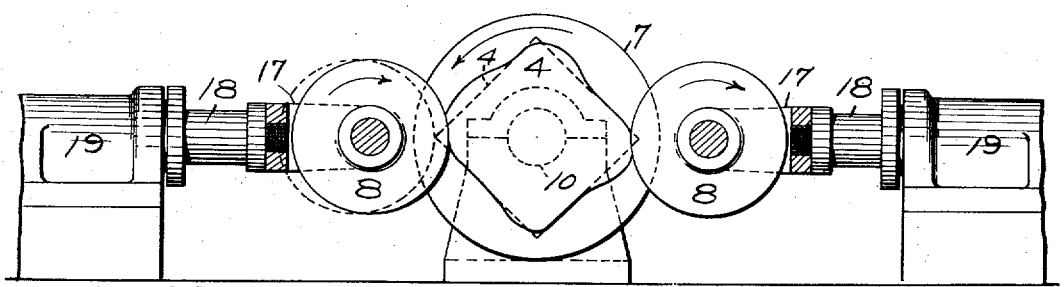
WITNESSES. INVENTOR.

UNITED STATES PATENT OFFICE.

JOHN M. HANSEN, OF PITTSBURG, PENNSYLVANIA, ASSIGNOR TO FORGED STEEL WHEEL COMPANY, OF PITTSBURG, PENNSYLVANIA, A CORPORATION OF PENNSYLVANIA.

METHOD OF MAKING CIRCULAR WROUGHT-METAL BLANKS.

No. 881,398.  Specification of Letters Patent.  Patented March 10, 1908.

Application filed May 19, 1906. Serial No. 317,740.

*To all whom it may concern:*

Be it known that I, JOHN M. HANSEN, a resident of Pittsburg, in the county of Allegheny and State of Pennsylvania, have invented a new and useful Improvement in Methods of Making Circular Wrought-Metal Blanks; and I do hereby declare the following to be a full, clear, and exact description thereof.

This invention relates to a method of forming circular wrought metal blanks, and especially circular steel blanks to be afterwards formed into car and like wheels.

The object of the invention is to provide a method of forming such blanks which avoids the production of scrap or other waste of metal.

One of the difficulties encountered in the manufacture of wrought steel car wheels and other circular articles is the somewhat excessive cost, this being due to a considerable extent to the difficulty and expense of producing the circular blanks necessary for this method of manufacturing car wheels. The general ways of producing such circular blanks have consisted in cutting or blanking the circular blank from a slab of metal, or taking a square slab or bloom and shearing the same to circular form. In both of these methods there is produced a large amount of scrap which has a low market value and therefore adds materially to the cost of the finished product.

My invention has for its object to overcome the objections and difficulties above mentioned in the production of circular wrought metal blanks.

The invention consists, generally stated, in taking a polygonal slab or bloom, preferably a square one, heating the same, and then subjecting its edges to a rolling action while confining the metal of said edges against sidewise flow, thereby gradually eliminating the angles and producing a circular blank without formation of scrap and at a minimum labor cost. Preferably the initial slab or bloom is square, as this form can be sheared from a large sized slab inexpensively and without waste.

Figure 1:
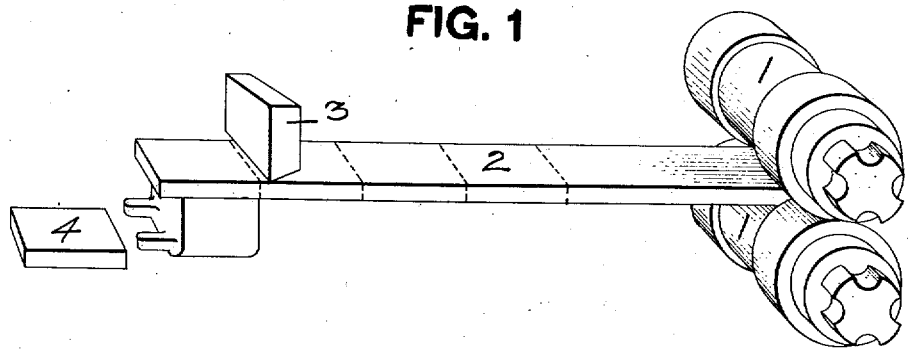
Figure 2:
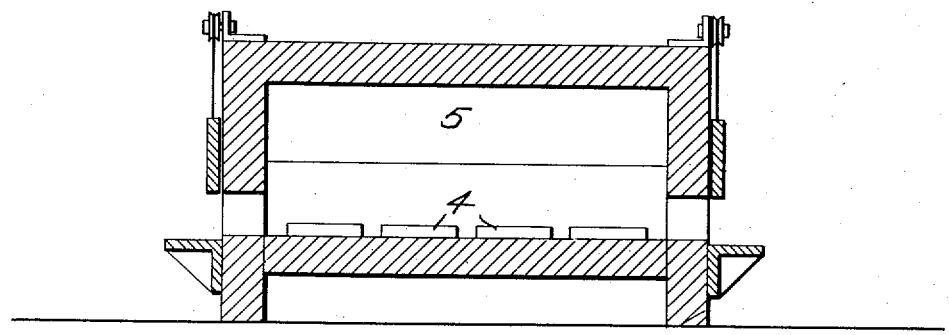
Figure 5:
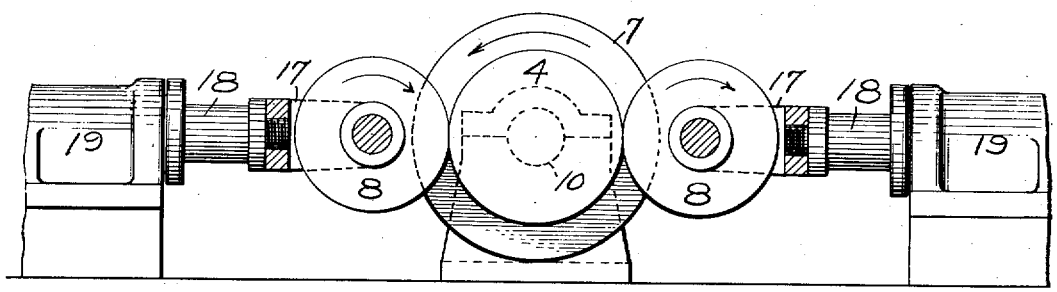
Figure 6:
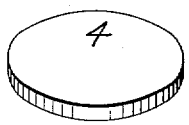

In the accompanying drawings Figure 1 is a perspective view illustrating the forming of the initial slab or bloom; Fig. 2 illustrates the slab and heating the initial blank; Fig. 3 is a horizontal section of suitable apparatus for converting the initial blank to circular shape; Fig. 4 is a transverse section of the apparatus on the line 4—4, Fig. 3, showing the commencement of the operation; Fig. 5 is a similar view illustrating the completion of the operation; and Fig. 6 is a perspective view of the finished blank.

In carrying out the invention I start with such a slab or bloom as can be most conveniently and cheaply obtained or produced, preferably a square slab, as this can be easily cut from a long rolled slab without the production of scrap or other waste, and hence can be produced or obtained at a low cost. Fig. 1 illustrates rolls 1 for forming a long slab 2 which is severed by a shear 3 into square slabs 4 which form the initial blanks for my process. Such blanks are then raised to a good forging heat, as in a suitable furnace 5, shown in Fig. 2, and are then converted into circular form. This may be effected by various forms of apparatus, that shown in the drawings being merely illustrative of a form suitable for this purpose.

The essentials of the apparatus comprise suitable clamping plates or disks 6 and 7 between which the blank 4 is held and, preferably, by means of which said blank is rotated. The plates or disks 6 and 7 preferably are larger than the blank 4 so that no portion of the latter projects beyond said plates or disks, for reasons which will hereinafter appear. Coöperating with these clamping plates or disks is a suitable roll or rolls 8 arranged to act against the edge of the blank and reduce the angles thereof, the same being sufficiently narrow to pass between the plates or disks 6 and 7 and engage the edges of the blank, and are arranged to be gradually fed toward the axis of the disk as the reduction progresses. Inasmuch as no portion of the blank projects beyond the plates or disks 6 and 7 the metal is confined against side flow and therefore must flow peripherally of the blank. The clamping plates 6 and 7 and roll or rolls 8 are so arranged as to cause the roll to travel around the periphery of the blank, either by holding the disks stationary and causing the roll or rolls to travel in an orbital path around the same, but preferably by holding the roll or rolls stationary and rotating the clamping plates or disks. The latter arrangement is shown in the drawings, each of said plates being provided with journals 9 and 10, one or both of which are connected to suitable driving means, such as a shaft 11 leading to an engine or other suitable motor. In order to clamp the blank tightly between these disks one thereof, such as the disk 7, has its journal 10 connected to suitable forcing mechanism, that shown in the drawing comprising a hydraulic cylinder 12 whose piston 13 is connected to the journal 10 by a suitable connector which permits the free rotation of the journal, the connector shown comprising suitable fingers 14 on one of the parts engaging an annular groove 15 in the other part.

The roll or rolls 8 must be fed toward the axis of the blank as the reduction progresses. Various manners of mounting the roll or rolls for this purpose will readily suggest themselves, the drawings showing said rolls mounted in yokes 17 on the ends of the piston rods 18 of the hydraulic cylinders 19 by means of which the rolls 8 are forced inwardly at the desired speed and to the desired extent.

In carrying out my process the non-circular initial blank, preferably square as shown, is first raised to a good rolling heat and is then clamped centrally between the plates or disks 6 and 7, being so firmly held between the same that it rotates therewith and the metal is absolutely confined against flowing sidewise. The disks with the contained blank are then rotated and the rolls 8 brought between the edges of said disks and in contact with the edge of the blank. Said rolls first strike the angles of the blank, as shown in Fig. 4, reducing the same and causing the metal to flow peripherally of the blank. The rolls are gradually fed inwardly thus further and further reducing the angles of the blank until it is brought to circular or approximately circular shape and of even thickness, as shown in Fig. 5, when the operation ceases and the blank is removed for further operations of forming the wheel.

It is well known that the action of rolls on metal causes the metal to flow longitudinally of the travel of the surface of the rolls. The action of the rolls 8 therefore causes a free flow of the metal with which it comes in contact peripherally of the blank in front of the rolls to fill up the flat or depressed portions on the blank and reducing the angles, and so bringing it to circular form.

By the process described a square or other irregularly shaped blank can be quickly and inexpensively reduced to circular form without the formation of any scrap whatsoever and without expanding the metal and straining the fiber thereof. On the contrary the metal is compressed, condensed, and its fiber strengthened, especially at the periphery of the blank. If there is any variation in the carbon or hardness in different parts of the slab from which the blank is rolled, by rolling down the corner portions of the blank and carrying the metal around the same this difficulty is overcome through the distribution of the surface metal around the periphery of the blank, giving an outer layer of substantially the same hardness throughout. Circular blanks formed according to this process therefore lend themselves peculiarly to the manufacture of car wheels in which a strong, tough and hard tread is highly desirable.

What I claim is:

1. The method of transforming a polygonal forged or rolled metal slab or blank into one of circular or curved outline consisting in heating the metal blank and while confining the sides of the blank so as to prevent thickening thereof subjecting the projecting portions of the edge thereof to pressure and thereby causing the metal of the projecting portions to fill up the low portions and produce a circular blank.

2. The method of reducing polygonal or irregularly shaped metal blanks to circular or curved form, consisting in confining the metal at the edge of the blank against side flow, and while so confining the same subjecting the projecting portions of said edge to pressure to cause the metal to flow peripherally and produce the circular blank.

3. The method of transforming a polygonal forged or rolled metal slab or blank into one of circular or curved outline, consisting in heating the blank, confining the metal at the edge of such blank against side flow, and while so confining the same subjecting said edge to rolling pressure, thereby causing the metal in the projecting portions to flow peripherally and producing the circular blank.

4. The method of transforming a polygonal forged or rolled metal slab or blank into one of circular or curved outline, consisting in heating such blank, rotating the same while confining the metal of the edges against side flow, and subjecting the edge thereof to rolling pressure, thereby causing the metal in the projecting portions to flow peripherally and produce the circular blank.

5. The method of transforming a polygonal forged or rolled metal slab or blank into one of circular or curved outline, consisting in heating such blank, then subjecting the edge thereof to a rolling action while confining the metal at the edges against side flow, and gradually extending said rolling action toward the center of the blank, thereby causing the metal in the angles to flow peripherally and producing the circular blank.

6. The method of transforming a polygonal forged or rolled metal slab or blank into one of circular or curved outline, consisting in heating such blank, clamping the same between plates which extend beyond the edge thereof, and then subjecting the edge of said blank to a rolling action and gradually extending said rolling action toward the center of the blank.

7. The method of forming circular wrought metal blanks, consisting in cutting a polygonal blank from a rolled metal slab, heating said blank, and then subjecting the edge thereof to rolling pressure while confining the metal at the edge against side flow.

In testimony whereof I the said JOHN M. HANSEN, have hereunto set my hand.

JOHN M. HANSEN.

Witnesses:
F. W. WINTER,
ROBERT C. TOTTEN.